US006641691B2

(12) United States Patent
Shadle et al.

(10) Patent No.: US 6,641,691 B2
(45) Date of Patent: Nov. 4, 2003

(54) METHOD OF MAKING A SUCCESSION OF IRREVERSIBLE THIN FILM DISPLAYS

(75) Inventors: Mark A. Shadle, Peachtree City, GA (US); David M. Good, Peachtree City, GA (US); Gerrit L. Verschuur, Lakeland, TN (US); Chauncey T. Mitchell, Jr., Lakeland, TN (US)

(73) Assignee: Timer Technologies, LLC, Algoma, WI (US)

( * ) Notice: Subject to any disclaimer, the term of this patent is extended or adjusted under 35 U.S.C. 154(b) by 256 days.

(21) Appl. No.: 09/910,335

(22) Filed: Jul. 20, 2001

(65) Prior Publication Data

US 2002/0014768 A1 Feb. 7, 2002

Related U.S. Application Data

(62) Division of application No. 09/426,225, filed on Oct. 22, 1999, now Pat. No. 6,270,122.

(51) Int. Cl.[7] .......... B32B 31/18

(52) U.S. Cl. .......... 156/155; 156/269; 156/277; 156/278; 156/280

(58) Field of Search .......... 156/145, 155, 156/250, 269, 270, 277, 278, 280, 292, 305, 324; 427/145, 282, 288, 293, 307, 308, 309; 40/406, 407, 615; 283/17, 72, 95, 96, 97, 901, 903; 116/206; 428/321.1, 321.5; 216/90

(56) References Cited

U.S. PATENT DOCUMENTS

| | | | | | |
|---|---|---|---|---|---|
| 3,414,415 | A | * | 12/1968 | Broad, Jr. | 116/206 |
| 4,230,344 | A | * | 10/1980 | Bell et al. | 283/84 |
| 4,273,362 | A | | 6/1981 | Carrier et al. | 283/6 |
| 4,360,548 | A | | 11/1982 | Skees et al. | 428/29 |
| 4,408,557 | A | | 10/1983 | Bradley et al. | 116/206 |
| 4,477,593 | A | * | 10/1984 | Tomlinson | 503/205 |
| 4,488,646 | A | | 12/1984 | McCorkle | 206/459 |
| 4,674,771 | A | | 6/1987 | Thompson, II | 282/8 R |
| 4,726,608 | A | | 2/1988 | Walton | 283/96 |
| 4,804,275 | A | * | 2/1989 | Kang et al. | 374/162 |
| 4,903,254 | A | | 2/1990 | Haas | 368/327 |
| 4,903,991 | A | | 2/1990 | Wright | 283/95 |
| 4,940,690 | A | | 7/1990 | Skees | 503/206 |
| 5,058,088 | A | | 10/1991 | Haas et al. | 368/327 |
| 5,282,651 | A | * | 2/1994 | Alonso | 283/117 |
| 5,430,277 | A | | 7/1995 | Ohno et al. | 235/382 |
| 5,431,452 | A | | 7/1995 | Chang et al. | 283/95 |
| 5,582,434 | A | | 12/1996 | Skov et al. | 283/81 |
| 5,601,887 | A | | 2/1997 | Rich et al. | 428/29 |
| 5,602,804 | A | | 2/1997 | Haas | 368/327 |
| 5,627,356 | A | | 5/1997 | Takemoto et al. | 235/381 |
| 5,633,835 | A | * | 5/1997 | Haas et al. | 116/207 |
| 5,667,250 | A | | 9/1997 | Behm et al. | 283/102 |
| 5,667,303 | A | * | 9/1997 | Arens et al. | 116/217 |
| 5,707,680 | A | | 1/1998 | Moore | 427/7 |
| 5,785,354 | A | * | 7/1998 | Haas | 283/74 |
| 5,807,625 | A | * | 9/1998 | Amon et al. | 428/195 |

* cited by examiner

*Primary Examiner*—Richard Crispino
*Assistant Examiner*—Cheryl N. Hawkins
(74) *Attorney, Agent, or Firm*—Eugene Stephens & Associates; Thomas B. Ryan

(57) ABSTRACT

Display information is revealed from behind a metal film that can be cleared upon effective contact with a clearing agent. The metal film, while opaque, is generally less than 1000 Angstroms thick and can be cleared by exposure to innocuous agents including food or other household products.

28 Claims, 11 Drawing Sheets

METHOD OF MAKING A SUCCESSION OF IRREVERSIBLE THIN FILM DISPLAYS

RELATED APPLICATIONS

This application is a Division of allowed parent application Ser. No. 09/426,225, filed Oct. 22, 1999, now U.S. Pat. No. 6,270,122 Mark A. Shadle, David M. Good, Gerrit L. Verschuur, and Chauncey T. Mitchell, Jr., entitled IRREVERSIBLE THIN FILM DISPLAY WITH CLEARING AGENT. The parent application is hereby incorporated by reference.

TECHNICAL FIELD

When actuated, irreversible displays undergo permanent changes in appearance. Initially obscured or otherwise hidden information is revealed by the changes of appearance.

BACKGROUND

Changes that take place in irreversible displays generally involve the revelation of indicia, which can range from a patch of color to text and pictures. The indicia can be revealed by chemical or physical agents that change themselves or that produce other changes in the displays. For example, opaque coloring agents can be rendered transparent to reveal underlying indicia, or similar agents can change from one color to another to indicate a change.

Chemical transformations in irreversible displays are sometimes used for security purposes to provide evidence of tampering or counterfeiting. U.S. Pat. No. 4,488,646 to McCorkle hides a warning message behind a solvent-sensitive blush coating to provide evidence of solvent tampering with letters, tickets, and other information-bearing constructions. Upon exposure to a wide range of aromatic or aliphatic solvents, the blush coating is transformed into a transparent state revealing the message. U.S. Pat. No. 4,903,991 to Wright discloses a document security system in which a latent image is developed by rupturing photoactive microcapsules to verify authenticity.

Mechanical transformations are more often used for interactive game pieces. The most common are scratch-off games in which an opaque coating is removed by abrasion to reveal a hidden indicium. Chang et al. in U.S. Pat. No. 5,431,452 separately position a latent image and a removable image-developing device on different portions of a substrate. The image-developing device contains a chromogenic composition that converts the latent image into a visible image.

SUMMARY OF INVENTION

Our irreversible displays exploit features of thin metal films, especially vapor deposited films, for such purposes as temporarily obscuring predetermined indicia from view and subsequently reacting with chemical clearing agents to reveal the predetermined indicia. The thin metal films can be cleared away to reveal underlying indicia, or the indicia can also be formed by clearing the films in predetermined patterns. The clearing process is visually engaging as a preferably lustrous metal progressively disappears.

One example of our irreversible display includes a metal layer having a surface that overlies an indicium, such as a contrasting color, a pattern, or a message. A substrate supports the metal layer and the indicium. A chemical clearing agent is supported on the substrate out of contact with the surface of the metal layer that overlies the indicium. The clearing agent is relatively movable into contact with the surface of the metal layer for inducing a chemical reaction that clears the metal layer and reveals the underlying indicium. The metal layer, which can be formed from a variety of metals including aluminum, zinc, or silver, is preferably thick enough to completely obscure the indicium but thin enough to rapidly disappear when placed in contact with the clearing agent. Thicknesses between 100 and 1000 Angstroms are preferred for these purposes.

The clearing agent can be drawn from a variety of materials including electrolytes, acids, bases, and other agents that participate in localized reactions for corroding or otherwise clearing the metal layer. Among the choices are many safe and environmentally friendly materials including edibles such as juices, carbonated beverages, and even condiments. The reactions that clear the metal layer include localized electrochemical reactions that oxidize the metal layer. In contrast to galvanic or electrolytic electrochemical reactions, the localized electrochemical reactions between the clearing agent and the metal layer produce a mixed electropotential and do not require a net flow of current through the metal layer.

Preferably, the substrate is one of a pair of top and bottom substrates between which the clearing agent is confined within a reservoir out of contact with the surface of the metal layer. The top substrate preferably includes a transparent portion (i.e., a window) that overlies the metal layer and the indicium. A gated pathway between the substrates can be used to direct the clearing agent from the reservoir into contact with the surface of the metal layer.

The reservoir can be arranged adjacent to or even surrounding the surface of the metal layer that overlies the indicium. Squeezing the reservoir forces some of the clearing agent along one or more of the gated pathways into contact with the surface of the metal layer from one or more directions. Alternatively, the clearing agent can be arranged to overlie the metal film at an initial separation set by a spacer. An opening through the spacer allows the clearing agent to be relatively moved into contact with the metal layer. The clearing agent of this overlapping arrangement can be an adhesive for maintaining contact with the surface of the metal layer after being relatively moved through the spacer opening.

Another example of our irreversible display includes a metal film, a display window aligned with the metal film, and an indicium that is aligned with the display window but obscured by the metal film. The window provides access to the metal film for exposing the metal film to a chemical clearing agent that clears a portion of the metal film and reveals the indicium. A separate access opening can also be provided along with a transport medium (e.g., a wick) to transport the clearing agent from the opening to the metal film.

The exemplary display can be activated by adding the clearing agent through the display window or other access opening. Contact between the clearing agent and the metal film produces a localized electrochemical reaction between the clearing agent and the metal film without generating an electromotive force beyond the clearing agent. The localized electrochemical reaction clears the metal film (in an apparent gnawing action) and reveals the indicium within the display window through an opening cleared in the metal film by the reaction with the clearing agent.

Other exemplary approaches for controlling contact between a clearing agent and a metal film include forming a breakable barrier layer and microencapsulating the clearing agent. Mechanical action such as squeezing or bending can be used to breach the barrier layer or release the clearing agent from microencapsulation. Adhesive clearing agents can be separately mounted and temporarily protected by a release liner. Upon removal of the release liner, the adhesive clearing agent can be moved in contact with the metal layer through an opening in the top substrate.

Instead of clearing the metal film to reveal an underlying indicium, the metal film can be cleared in a pattern (e.g., a stencil) that forms its own indicium. For example, a protective layer could be laid out in a pattern on the metal film. Exposing a portion of the metal film that is not covered by the protective layer to a clearing agent changes the exposed metal film from opaque to clear. The remaining portion of the metal film that is covered by the protective layer is sheltered from similar exposure to the clearing agent. The two portions of the metal film are arranged for producing a predetermined pattern upon exposure of the first portion of the metal film to the clearing agent.

Our irreversible displays can be manufactured by an in-line press. All of the layers including substrates, metal films, clearing agents, graphics, adhesives, and spacers can be formed from individual webs or from layers applied to the individual webs. The result is a succession of thin flexible displays that can be manufactured quickly at low cost and integrated if desired with other press-produced or otherwise compatible articles.

DRAWINGS

DETAILED DESCRIPTION

The irreversible displays of our invention take a variety of forms actuatable by reacting chemical clearing agents with metal films for revealing indicia. In-line press produced adaptations are preferred for high-volume low-cost manufacture.

Figure 1:
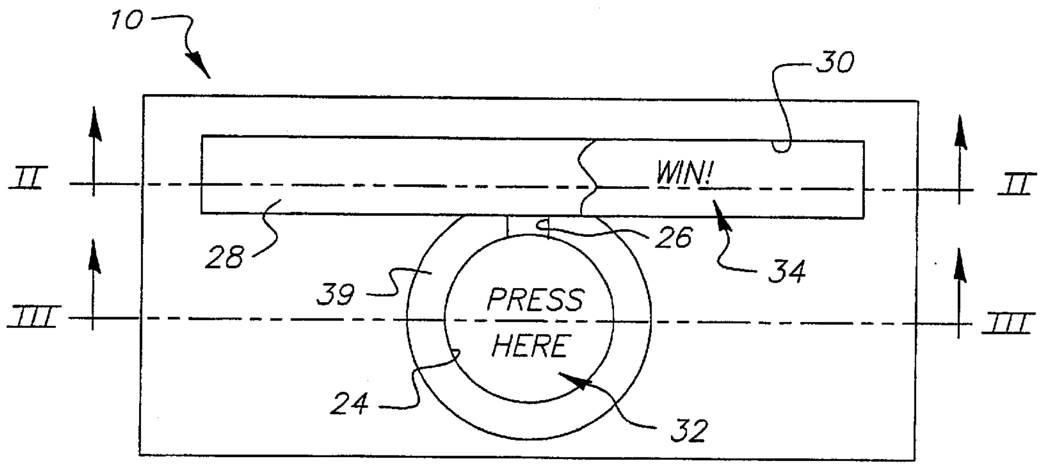
FIG. 1 is a plan view of an irreversible display activated by squeezing a clearing agent from a reservoir. A portion of a metal film is cut away to show a portion of an underlying graphic layer.
Figure 2:
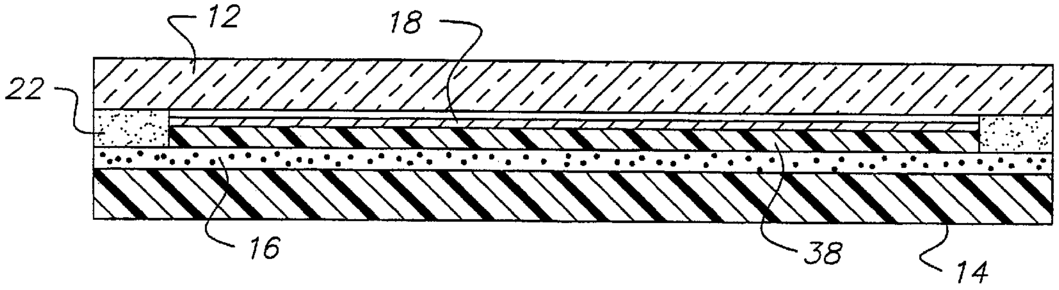
FIG. 2 is a cross-sectional view of the display taken along line II—II of FIG. 1.
Figure 3:
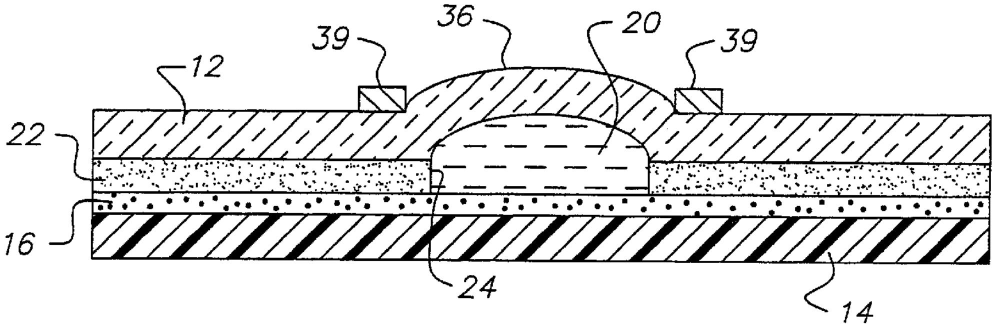
FIG. 3 is a cross-sectional view of the display taken along line III—III of FIG. 1.

One such irreversible display 10 shown in FIGS. 1–3 includes a pair of top and bottom substrates 12 and 14 supporting between them a graphics layer 16 overlaid in one location by a metal film 18 and in another location by a chemical clearing agent 20. An adhesive layer 22 bonds the two substrates 12 and 14 together, leaving space for a pocket reservoir 24 that confines the clearing agent 20 and a gated pathway 26 that provides for distributing the clearing agent from the reservoir 24 over a surface 28 of the metal film 18. Although only one gated pathway 26 is shown, additional gated pathways can be provided for directing the clearing agent 20 to multiple locations on the surface 28 of the metal film 18. More than one reservoir 24 could also be provided to direct the clearing agent to multiple locations, such as from opposite ends of the surface 28.

The top substrate 12 is preferably transparent at least in a windowed area 30 aligned with the metal film 18. The bottom substrate can be entirely opaque. Both can have a single-ply or a multi-ply construction made from a variety of materials including paper and plastic. For example, the top and bottom substrates 12 and 14 can be formed by a combination of low-density polyethylene (LDPE), high-density polyethylene (HDPE), and polyethylene terephtalate (PET). The substrate material is preferably adaptable for web transport.

An indicium 32 of the graphics layer 16, such as the message "press here", is preferably viewable through both the top substrate 12 and the clearing agent 20 to provide instructions for activating the display 10. Similar instructions could also be provided elsewhere on or between the top and bottom substrates 12 and 14. However, an indicium 34 of the graphics layer 16 such as "you win!" is temporarily blocked from view by the metal film 18. Any other overlying layers including the windowed area 30 of the top substrate 12 are preferably transparent or at least translucent. Conventional printing techniques with ink can be used to form the graphics layers.

A bulge 36 can be formed in the top substrate 12 to confine additional clearing agent 20 within the reservoir 24. Vacuum pressure, heat, or stamping can be used to form the bulge 36. An intervening layer such as a spacer (not shown) between the top and bottom substrates 12 and 14 could also be used to add depth to the reservoir 24. The adhesive layer 22, which is preferably a pressure-sensitive adhesive, provides a seal around the reservoir 24 to confine the clearing agent 20 and to isolate the clearing agent 20 from environmental influences. In place of or in addition to the adhesive layer 22, a heat seal could be formed between the top and bottom substrates 12 and 14 to achieve similar ends.

The gated pathway 26 is initially closed to isolate the clearing agent 20 from the metal film 18 but can be opened by application of pressure to the reservoir 24. The initially closed and later opened valve function of the gated pathway 26 can be accomplished by forming a weaker bond between the substrates 12 and 14 across the gated pathway 26 than elsewhere surrounding the reservoir 24. A weaker adhesive, a release agent, or a cooler heat seal could be used for this purpose. The length of the gated pathway 26 can also be adjusted to influence the valve function.

The metal film 18 is preferably a smooth uniformly thin film of sputtered or vapor-deposited metal, such as zinc, aluminum, or silver, bonded by its manufacturing technique to an underlying transparent (or at least translucent) substrate 38, such as a thin polyester film. Alternatively, the metal film could be formed by an at least partially self-supporting foil that is thin enough to clear at a desired rate in the presence of the clearing agent 20. The foil could be laminated or transfer printed onto an intermediate substrate, such as the substrate 28, or onto the graphics layer 16 of the underlying substrate 14. For most applications, clearing should take place in less than one minute. Metal film thicknesses between 100 Angstroms and 1000 Angstroms can be cleared at the required rate. The metal film 18 is preferably highly reflective to further obscure the underlying indicium 34.

The chemical clearing agent 20 preferably takes the form of a liquid or gel, such as a hydrogel, that is movable (e.g., squeezable) from the reservoir 24 through the gated pathway 26 over the surface 28 of the metal film 18. A wide variety of materials can function as clearing agents including oxidants, acids, salts, and alkalis, as well as combinations of these groups of materials. Other materials including thickeners (e.g., hydrogels) can be added to adjust physical properties such as viscosity, yield value, and surface tension to achieve desired flow and coverage characteristics. Preferred mixtures contain materials that are safe and environmentally friendly. One example formulated for clearing a zinc film contains the following combination of materials:

49% water

35% citric acid

15% potassium chloride

1% gel medium (thickener)

Squeezing the bulge 36 forces the clearing agent 20 from the reservoir 24 through gated pathway 26 and over the surface 28 of the thin metal film 18. In just a few seconds (e.g., 5 seconds) following exposure to the clearing agent 20, the metal film 18 disappears revealing the underlying indicium 34. The thickness and composition of the metal film 18 as well as the amount and composition of the clearing agent 20 can be varied to adjust the rate of clearing. The oxidation, dissolution, or other disappearance of the thin metal film is irreversible.

A collar 39 surrounds the bulge 36 to prevent the bulge from being inadvertently squeezed, especially when the display 10 is wound into a roll together with a succession of similar displays produced by an in-line press. Although shown as a separate substrate, the collar 39 could also be formed by embossing one or more of the other substrates 12 and 14 of the display 10. As shown, the collar 39 almost completely surrounds the bulge 36. However, the collar 39 could be limited to diametrical areas at which the bulge 36 is subject to the most pressure upon winding. In addition, while the inner periphery of the collar 39 at least partially envelops the bulge 36, the outer periphery of the collar can occupy up to all of the remaining surface area of the display 10.

Figure 4:
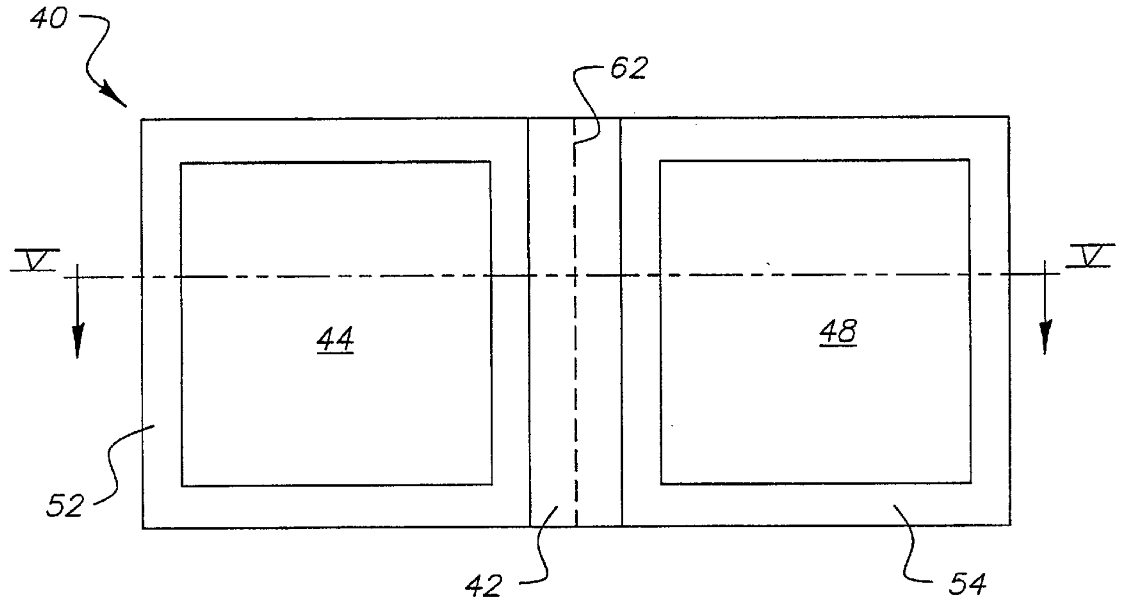
FIG. 4 is a top view of an irreversible display activated by folding. The view is taken along line IV—IV of FIG. 5 with a release liner removed to better view the active surfaces.
Figure 5:
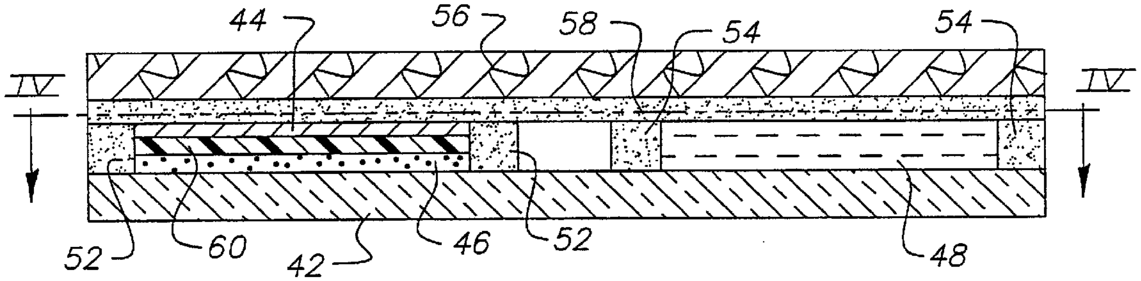
FIG. 5 is a cross-sectional view of the entire display taken along line V—V of FIG. 4.
Figure 6:
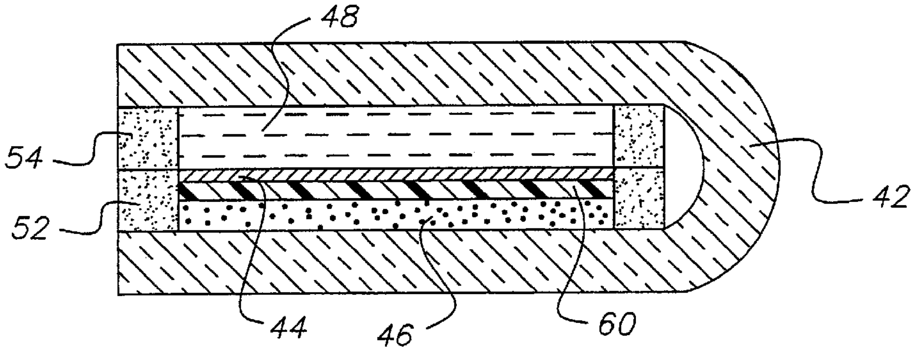
FIG. 6 is a similar cross-sectional view of the display folded into an activated position.

An irreversible display cell 40 shown in FIGS. 4–6 is activated by a folding action. A common base substrate 42 supports a thin metal film 44 overlying a graphics layer 46 in one area and a chemical clearing agent 48 in another area. Both areas are surrounded by pressure-sensitive adhesive borders 52 and 54 and covered by a removable liner 56 having a release layer 58. The metal film 44 is supported on a transparent substrate 60, but could be replaced by a self-supporting foil.

The clearing agent 48 also preferably takes the form of a pressure-sensitive adhesive. Oxidants, acids, salts, or alkalis can be added to a conventional pressure-sensitive adhesive to adjust its efficacy for clearing the metal film 44; or the pressure-sensitive adhesive could be reformulated with mildly corrosive properties. The release layer 58 is preferably made of silicone, but other release materials having low adherence to the pressure-sensitive adhesive borders 52 and 54 and the clearing agent 48 could also be used.

The display 40 is activated by removing the liner 56 and folding the substrate 42 about a fold line 62 to move the clearing agent 48 into contact with the metal film 44. The two pressure-sensitive adhesive borders 52 and 54 also contact each other for securing the display 40 in the folded position. The contact between the clearing agent 48 and the metal film 44 triggers a spontaneous chemical reaction that clears the metal film 44. Both the clearing agent 48 and at least the overlying portion of the folded substrate 42 are preferably transparent (or at least translucent) to provide a window for viewing the graphics layer 46, which is revealed by the disappearance of the metal film 44.

Other instructional or decorative graphics can be located elsewhere on the substrate 42 or the liner 56. For example, additional graphics could be used to block viewing of the graphics layer 46 through the base substrate 42. Also, the liner 56 could be limited to covering the clearing agent 48 in the unfolded position, and the clearing agent 48 alone (i.e., without the adhesive borders 52 and 54) could be used to subsequently secure the display 40 in the folded position.

Figure 7:
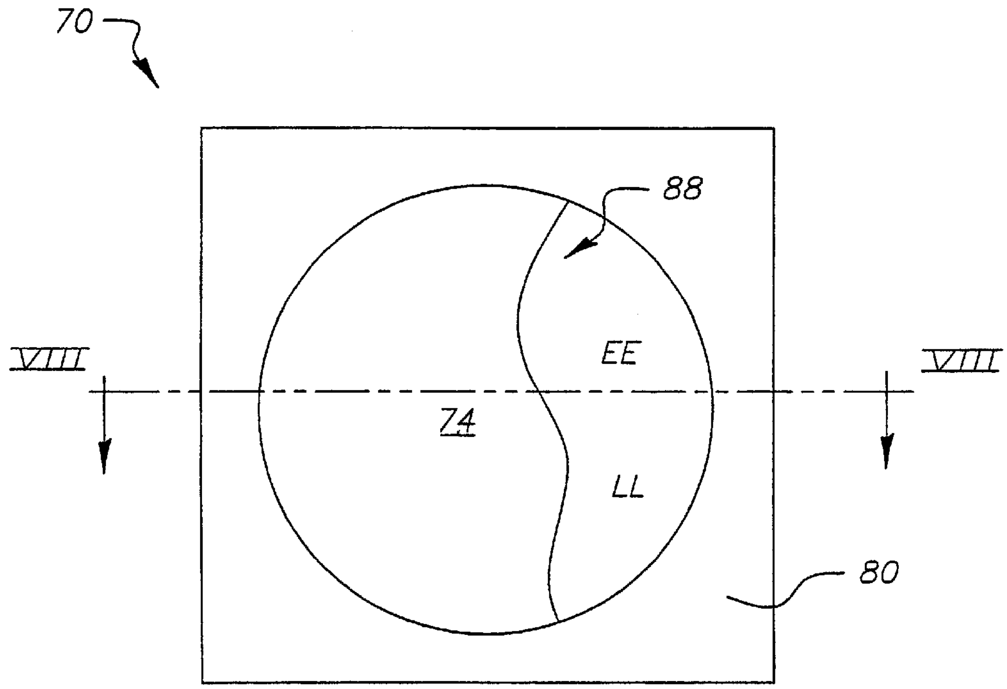
FIG. 7 is a plan view of an irreversible display arranged in a stack with a portion of a metal film cut away to show a portion of an underlying graphic.
Figure 8:
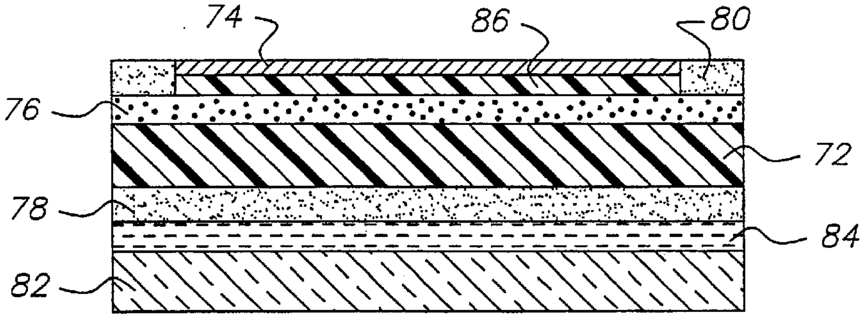
FIG. 8 is a cross-sectional view of the display taken along line VIII—VIII of FIG. 7.
Figure 9:
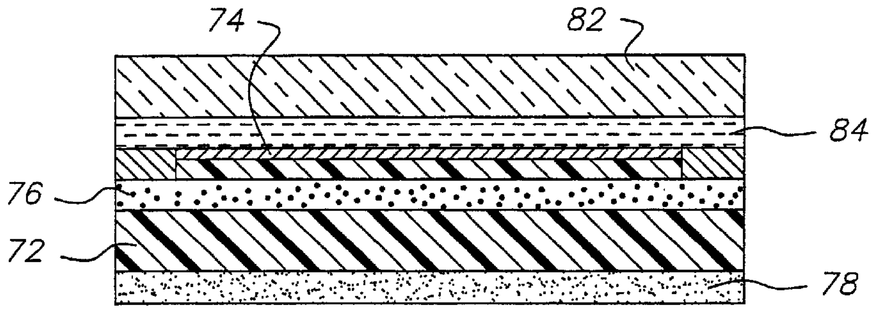
FIG. 9 is a similar cross-sectional view of the display with the layers reordered to activate the display.

An irreversible display 70 in a stack configuration is illustrated by FIGS. 7–9. A first substrate 72, which is preferably opaque, supports a metal film 74 over a graphics layer 76 on one side and a release layer 78 on an opposite side. A border 80 surrounds the metal film 74. The border 80 can be formed by an additional substrate, graphics, or other layer to complete a top surface of the display 70. A second substrate 82, which is preferably transparent or at least translucent, supports a chemical clearing agent 84, preferably in the form of a pressure-sensitive adhesive.

The metal film 74 is again shown in its preferred form deposited onto a transparent (or at least translucent) substrate 86. However, in contrast to the preceding embodiment, the metal film 74 is exposed to the environment, so appropriate care must be taken to avoid contact with substances that might inadvertently act as clearing agents.

Activating the display 70 is accomplished by removing the second substrate 82 together with the clearing agent 84 from the release layer 78 and remounting the second substrate 82 over the first substrate 72 to move the clearing agent 84 into contact with the metal film 74. The accompanying disappearance of the metal film 74 reveals an underlying indicium 88, such as "free refill". The indicium 88 is visible through both the second substrate 82 and the clearing agent 84.

Figure 10:
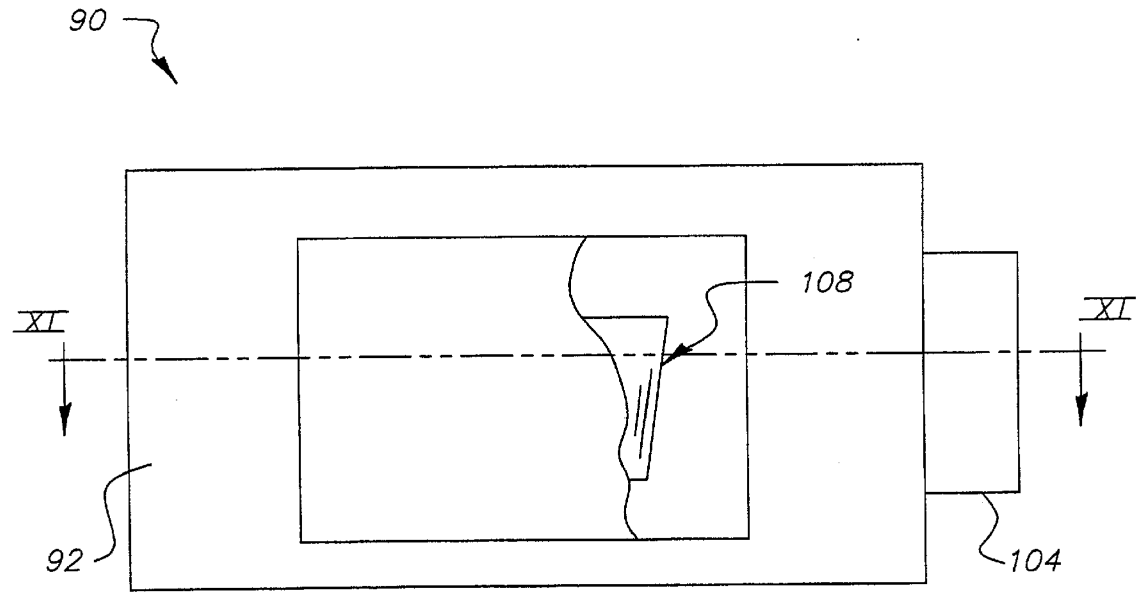
FIG. 10 is a plan view of an irreversible display arranged with a removable spacer between active layers of the display. The metal film is cut away to show a part of pattern hidden behind the metal film.
Figure 11:
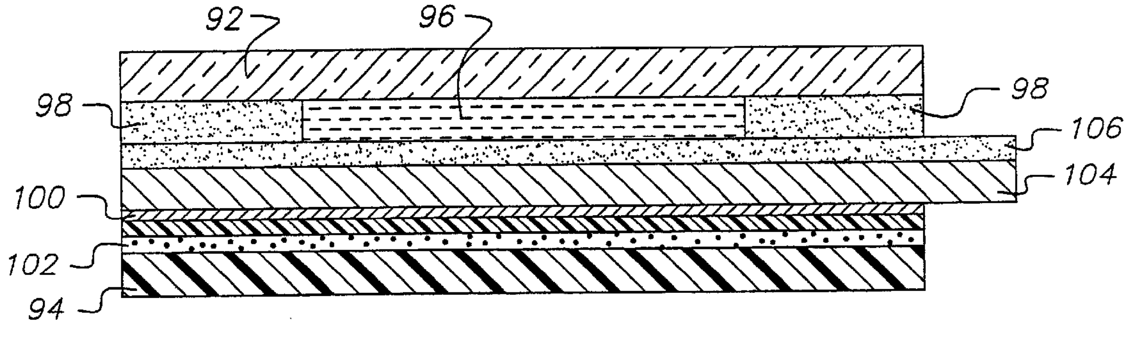
FIG. 11 is a cross-sectional view of the display taken along line XI—XI of FIG. 10.

Another irreversible display 90 constructed with similar layers is shown in FIGS. 10 and 11. Between top and bottom substrates 92 and 94 is a progression of layers including a chemical clearing agent 96 surrounded by a border 98 (such as an adhesive or other confining material) and a metal film 100 overlying a graphics layer 102. The top substrate 92 and the clearing agent 96 are preferably transparent or at least translucent. The bottom substrate 94 is preferably opaque.

A removable spacer 104 having a release layer 106 separates the clearing agent 96 from the metal film 100. The release layer 106 exhibits little adhesion to the clearing agent 96 or to its border 98. The display 90 is activated by removing the spacer 104 and moving the clearing agent 96 into contact with the metal film 100. The clearing agent 96 is preferably a gel or an adhesive that can maintain contact with the metal film 100 until the film disappears revealing the underlying graphic 102. An exemplary indicium 108 formed by the graphic 102 and revealed through the windowed structure of the display 90 is a picture of a cup.

Figure 12:
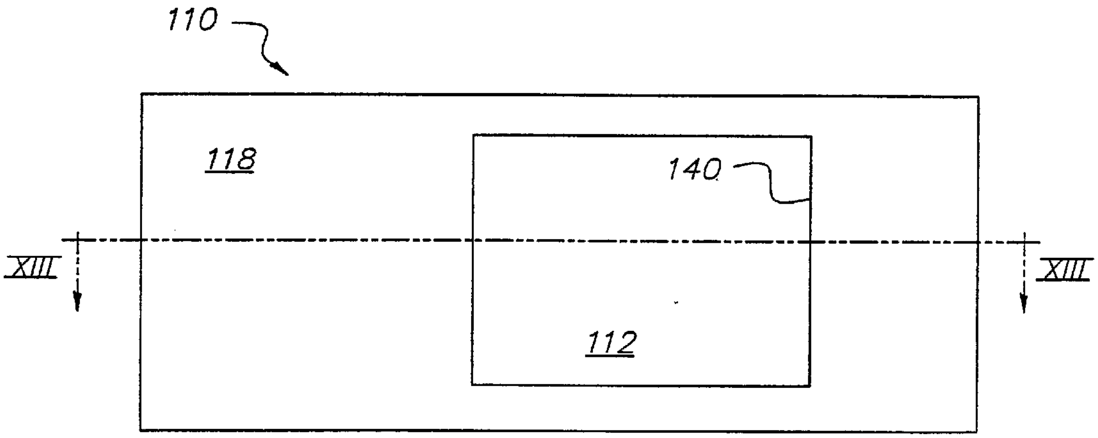
FIG. 12 is a plan view of an irreversible display with a metal film arranged as a switch arm for activating the display.
Figure 13:
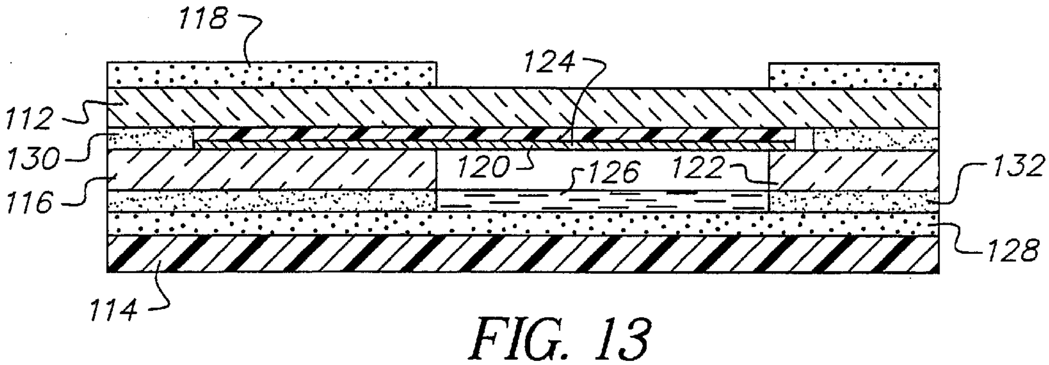
FIG. 13 is a cross-sectional view of the display taken along line XIII—XIII of FIG. 12 with the switch in an open position.
Figure 14:
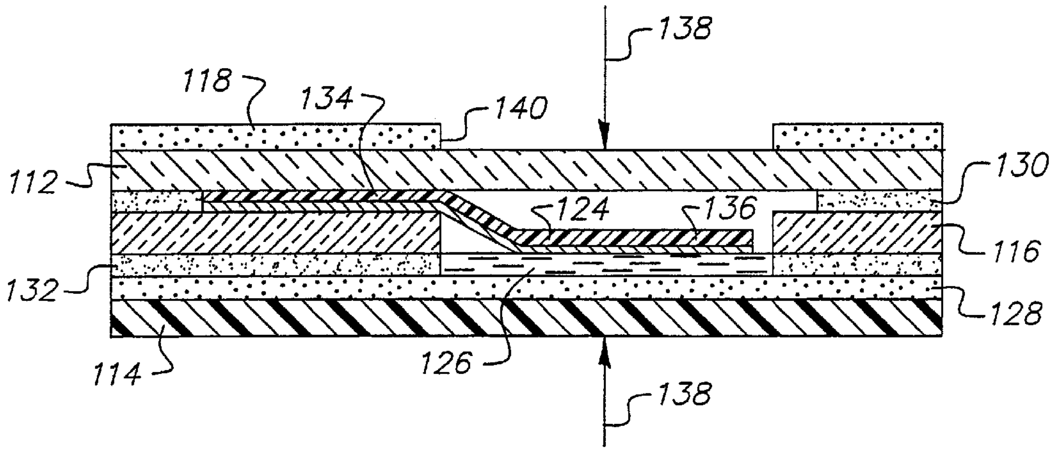
FIG. 14 is a similar cross-sectional view of the display with the switch in a closed position.

An irreversible display 110 with internal switching capabilities is shown in FIGS. 12–14. Top and bottom substrates 112 and 114 are again used along with a spacer 116. A graphics layer 118 is printed on the top substrate 112 providing instructions, information, or decorative design. The top substrate 112 and the spacer 116 capture between them a metal film 120 that straddles an opening 122 in the spacer 116. The preferred metal film 120 is deposited onto a surface of a transparent substrate 124 facing the bottom substrate 114.

A chemical clearing agent 126, which has the form of an adhesive, overlies a graphics layer 128 on the bottom substrate 114 within the spacer opening 122. Surrounding layers of adhesive 130 and 132 bond the top substrate 112 to the spacer 116 and bond the spacer 116 to the bottom substrate 114. A fixed end 134 of the metal film 120 is firmly anchored between the top substrate 112 and the spacer 116, but a free end 136 is only temporarily captured between the same layers.

Squeezing the top and bottom substrates 112 and 114 together where shown by arrows 138 in FIG. 14 deforms the two substrates 112 and 114, disengages the free end 136 of the metal film 120 from between the top substrate 112 and the spacer 116, and moves the metal film 120 into contact with the adhesive clearing agent 126. The top and bottom substrates 112 and 114 are both preferably resilient and return to their original shape after the squeezing action is discontinued. However, the free end 136 of the metal film 120 remains in contact with the adhesive clearing agent 126, thereby separating from the top substrate 112.

Contact between the metal film 120 and the clearing agent 126 clears the metal film 120 in the usual manner, revealing the underlying graphics layer 128 along with any indicia formed by the graphics layer 128. Both the top substrate 112 and the clearing agent 126 should be transparent or at least translucent for viewing the underlying graphics layer 128 through a window 140 framed by the graphics layer 118 and the spacer 116.

Similar results can be obtained by supporting the adhesive clearing agent 126 for movement through the opening 122 into contact with the metal film 120. In addition, a hidden graphics layer could be positioned between the metal film 120 and the top substrate 112 for viewing a change in the display through the bottom substrate 114.

Figure 15:
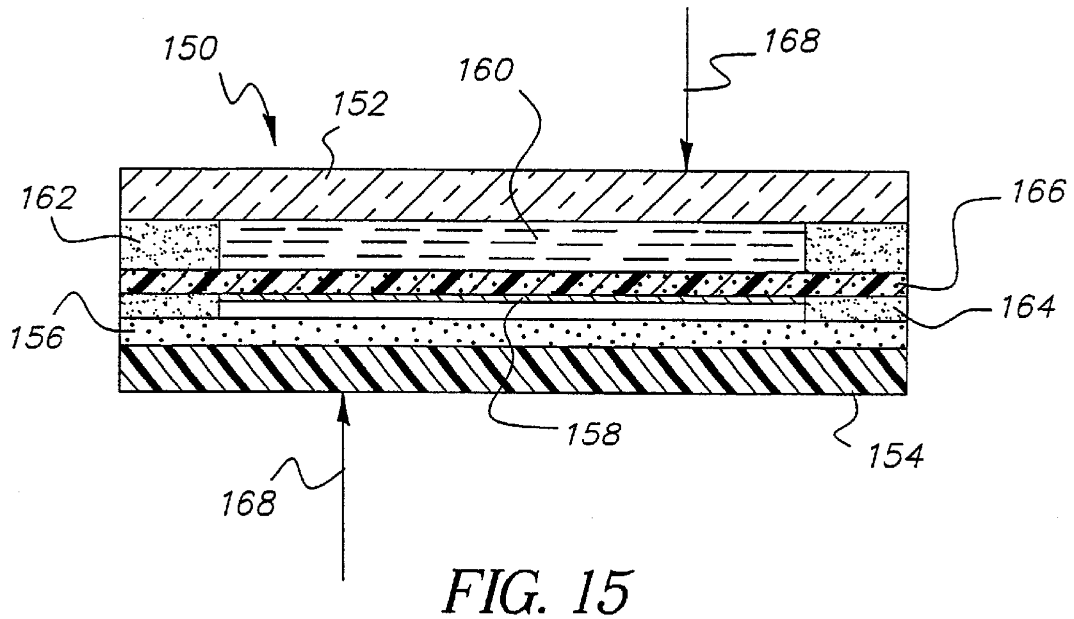
FIG. 15 is a cross-sectional view of another irreversible display with a breakable barrier layer separating a clearing agent and a metal film.
Figure 16:
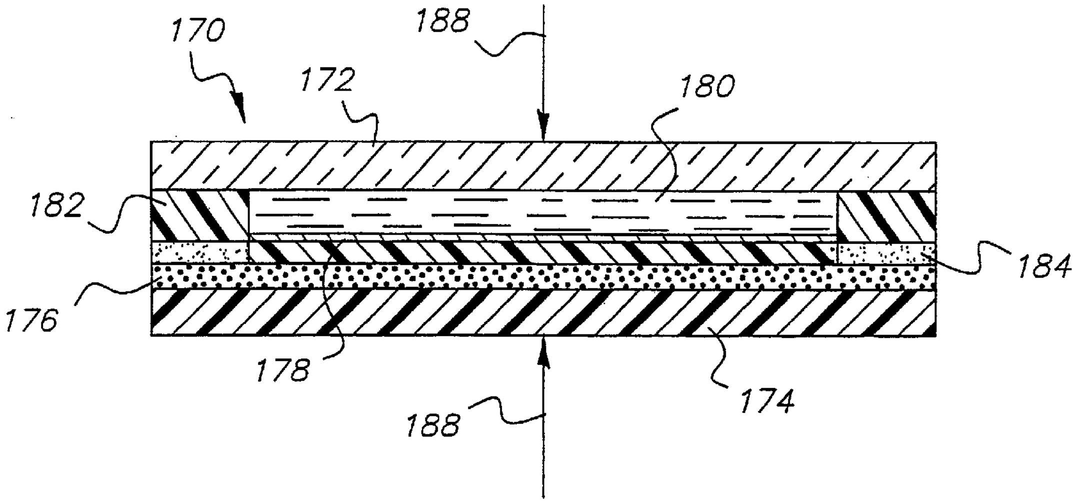
FIG. 16 is a cross-sectional view of a similar display with the clearing agent microencapsulated to temporarily separate the clearing agent from the metal film.

Two more irreversible displays 150 and 170 with internal switching mechanisms are shown in FIGS. 15 and 16. Both have similar top substrates 152, 172 and bottom substrates 154, 174. The bottom substrates 154 and 174 support similar graphics layers 156 and 176 that are overlain by metal films 158 and 178. Clearing agents 160 and 180 are also supported between the top and bottom substrates 152, 154 and 172, 174. Adhesive layers 162, 182 surround the clearing agents 160, 180; and adhesive layers 164, 184 surround the metal films 158, 178.

The display 150 has a temporary barrier layer 166 in the form of a stratum separating the clearing agent 160 from the metal film 158. The barrier layer 166 can be formed by a varnish or other material that does not react with the metal film 158 and that can be ruptured by an external force or moment.

For example, arrows 168 represent a moment that can be applied to the display 150 to rupture the barrier layer 166 and allow the clearing agent 160 to contact the metal film 158. Clearing the metal film 158 renders the underlying graphics layer 156 visible through the top substrate 152, the clearing agent 160, and any remaining portion of the barrier layer 166. Any substrate on which the metal film is supported should also be transparent or at least translucent, consistent with all of the earlier examples.

Instead of a distinct barrier layer, the display 170 microencapsulates the clearing agent 180 for temporarily separating the clearing agent 180 from the metal film 178. Squeezing the top and bottom substrates 172 and 174 together as indicated by arrows 188 releases the clearing agent 180 from microencapsulation and allows contact between the clearing agent 180 and the metal film 178. The intended reaction clears the metal film 178, rendering the underlying graphics layer 176 visible through the top substrate 172.

In place of microencapsulation, the corrosive chemical effects of the clearing agent 180 could be temporarily blocked, such as by freezing the clearing agent 180. Upon thawing, the corrosive properties of the clearing agent 180 would be restored. The temperature at which the clearing agent 180 thaws can be adjusted by the composition of the clearing agent. An irreversible record of the thaw is provided by the cleared metal film 178.

Similar to the earlier examples, the hidden graphics layers 156 and 176 of the irreversible displays 150 and 170 could be located adjacent to what is now their top substrates 152 and 172 and the viewing of the repositioned graphics layers 156 and 176 could take place through what is now their bottom substrates 154 and 174. The clearing agents 160 and 180 preferably have a liquid or gel form that is flowable upon release from confinement or encapsulation.

Figure 17:
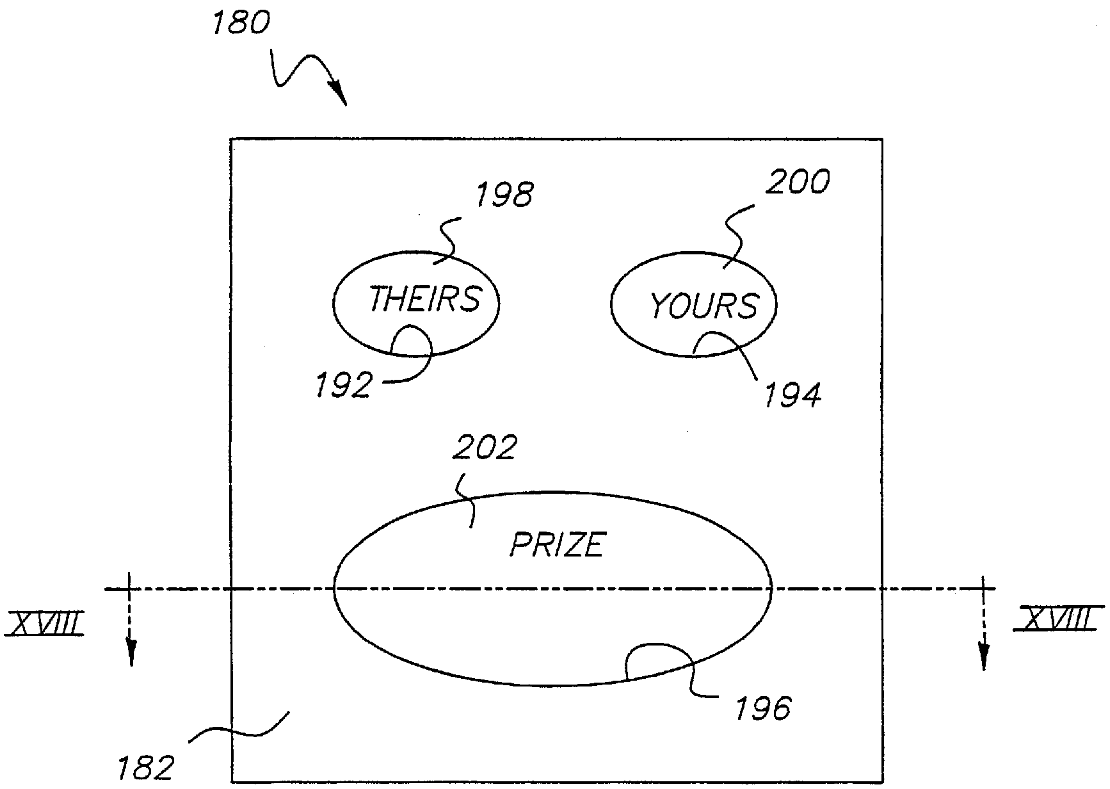
FIG. 17 is a plan view of an irreversible display having a metal film exposed for applying a clearing agent from an exterior source.
Figure 18:
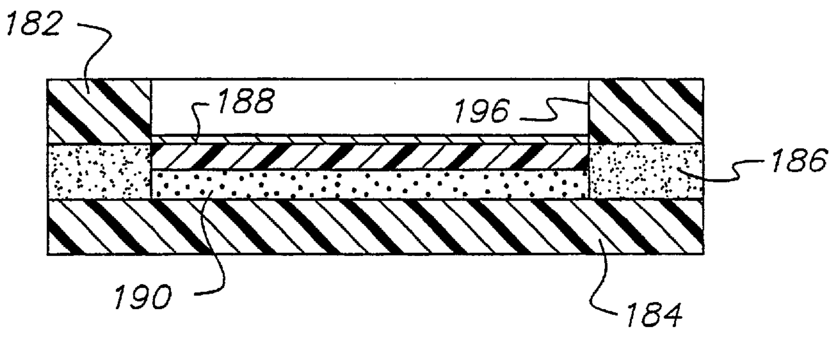
FIG. 18 is a cross-sectional view taken along line XVIII—XVIII of FIG. 17.

An irreversible display 180 depicted in FIGS. 17 and 18 relies on an external supply of chemical clearing agent to change states. Top and bottom substrates 182 and 184 joined together by an adhesive layer 186 provide the desired support for a metal film 188 and an underlying graphics layer 190. However, openings 192, 194, and 196 in the top substrate 182 expose different portions of the metal film 188 to the surrounding environment.

Any number of prescribed clearing agents can be applied to the exposed portions of the metal film by separately adding one of the clearing agents through the openings 192, 194, 196 or by immersing the entire display 180 in one of the clearing agents. A separate substrate could also be provided to support or confine the clearing agent until needed to activate the display. Spontaneous chemical reactions resulting from the addition of the clearing agent through the openings 192, 194, and 196 clear localized areas of the metal film 188 revealing indicia 198, 200, and 202 formed in the graphics layer 190.

Figure 19:
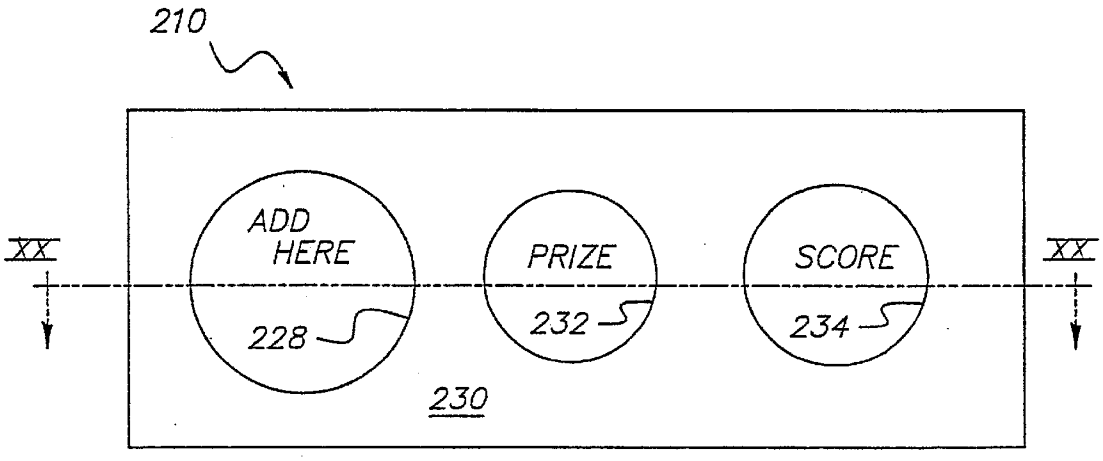
FIG. 19 is a plan view of an irreversible display having a wicking layer for transporting a clearing agent from an exterior source to two different sites covered by metal film.
Figure 20:
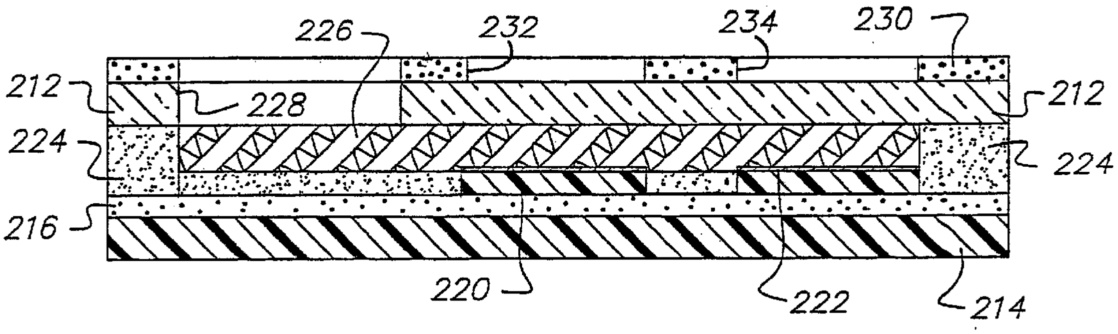
FIG. 20 is a cross-sectional view taken along line XX—XX of FIG. 19.

Another irreversible display 210 requiring an external supply of clearing agent is depicted in FIGS. 19 and 20. A top substrate 212 and a bottom substrate 214 support intervening layers including a graphics layer 216 and two separate metal films 220 and 222 laid out over different portions of the graphics layer 216. Adhesive layer 224 bonds the two substrates 212 and 214 together.

A wicking layer 226 contacts both metal films 220 and 222 and is exposed to the surrounding environment through an opening 228 in the top substrate 212. Another graphics layer 230 is printed on the top substrate 212, which is preferably otherwise transparent, to provide instructions and other information related to the function of the display 210 and to define windows 232 and 234 through which the metal films 220 and 222 are visible. The wicking layer 226 can be made of paper or other material that can absorb and transport a chemical clearing agent having a liquid or gel form.

Clearing agents added through the opening 228 in the top substrate 212 are absorbed by the wicking layer 226 and are transported by capillary action into contact with the two metal films 220 and 222. Clearing first takes place at the metal film 220 and is later followed by clearing at the metal film 222. Indicia 236 and 238, which are revealed in the graphics layer 216, can be meaningfully sequenced to attract and hold a viewer's attention.

Capillary action can also be used to transport the clearing agent stored within a display reservoir to one or more metal films or to one or more portions of the same metal film. The clearing agent can be transported along wicks in more than one direction to display different indicia at once or in a single direction to display indicia in sequence.

Figure 21:
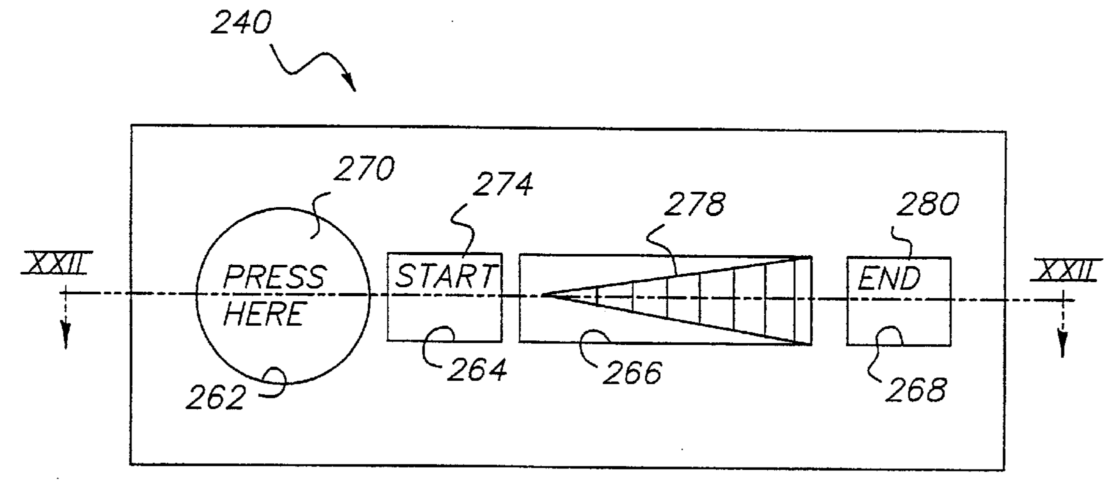
FIG. 21 is a plan view of an irreversible display arranged for progressively clearing a metal film. Graphic indicia underlying the metal film are visible.
Figure 22:
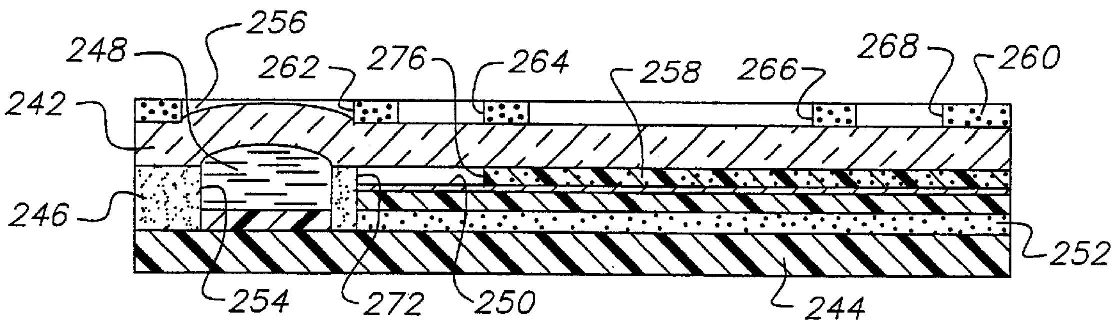
FIG. 22 is a cross-sectional view taken along line XXII—XXII of FIG. 21.

In addition to clearing areas of the metal film overlapped by the clearing agent, adjacent areas can be progressively cleared along a common boundary between the clearing agent and the metal film. An irreversible display 240 exemplifying this progressive clearing function is illustrated in FIGS. 21 and 22. Top and bottom substrates 242 and 244 joined by an adhesive layer 246 confine between them in separate locations a chemical clearing agent 248 and a metal film 250 overlying a graphic layer 252.

The clearing agent 248, which is in a flowable form, is initially confined within a reservoir 254 bounded by the top and bottom substrates 242 and 244 and the adhesive layer 246. A bulge 256 is formed in the top substrate 242 to expand the reservoir 254. A protective coating 258 made from an inert material such as a varnish or an adhesive is applied over a portion of the metal film 250 remote from the reservoir 254. A graphics layer 260 applied to the top substrate 242, which is preferably transparent, defines a series of windows 262, 264, 266, and 268.

The window 262 exposes the reservoir 254 of clearing agent 248, revealing an instructional indicium 270 ("press here") in the graphics layer 252. Squeezing the reservoir 254 as instructed forces the clearing agent 248 through a gated pathway 272 over a first portion of the metal film 250, revealing the underlying indicium 274 ("start"). The protective coating 258 blocks further flows of the clearing agent 248 over the metal film 250. However, after the overlapped portion of the metal film 250 is cleared within the window 264, an edge 276 of the metal film 250 remains in contact with the clearing agent 248. Clearing continues at a slower pace but in a progressive manner at the edge 276, which forms a common boundary between the clearing agent 248 and the metal film 250.

As the edge 276 retreats into the remaining metal film 250, a further indicium 278 in the form of a pattern is progressively revealed in the window 264. During the retreat, the area occupied by the clearing agent 248 progressively expands and the area occupied by the metal film 250 progressively diminishes. The rate of edge retreat can be adjusted to provide a timing function, particularly by controlling the percentage of active ingredients in the clearing agent 248.

The graphics layer 260 blocks a view along a portion of the path of edge retreat in advance of the window 268 to provide a period of delay. The edge retreat continues out of sight until the edge 276 becomes visible in the window 268. Another indicium 280 ("end") in the graphics layer 252 is revealed in the window 268 following the disappearance of the overlying metal film 250 behind the edge 276.

The number, size, shape, and contents of the windows can be varied to suit particular applications. Except for the metal film 250, all of the layers that overlie the graphics layer 252 within the windows are preferably transparent or at least translucent. The progressive clearing of the metal film 250 along a retreating edge 276 can take place in more than one direction and can be rendered visible throughout any or all of the path of retreat.

Figure 23:
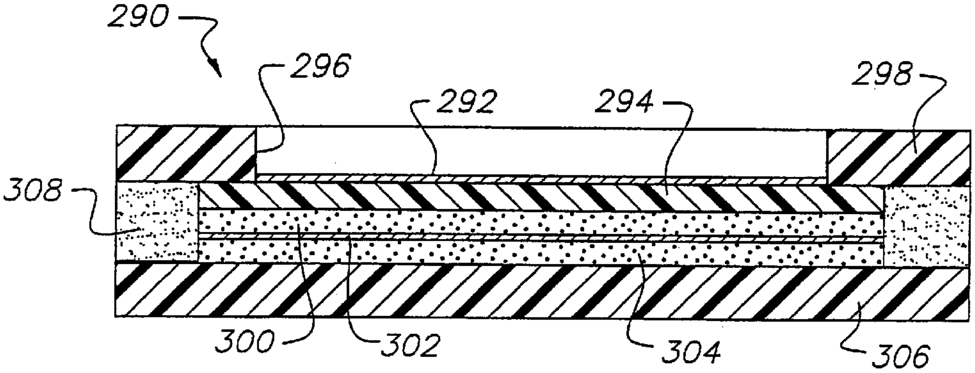
FIG. 23 is a cross-sectional view of an irreversible display having two layers of metal film to protect an intervening graphics layer from discovery until the display is activated.

An irreversible display 290 shown in FIG. 23 is arranged to be particularly useful for security purposes in such instruments as coupons, tickets, vouchers, and seals. The display 290 highlights security features that are otherwise adaptable to any or all of the embodiments previously illustrated.

For example, a first metal film 292 deposited onto a transparent substrate 294 is exposed through an opening 296 in a top substrate 298. The opening 296 provides access for moving a chemical clearing agent (not shown) into contact with the first metal film 292. However, the clearing agent could also be supplied from an adjacent or overlying reservoir in accordance with the earlier embodiments.

In contrast with the preceding embodiments, a first graphics layer 300 is applied to a back surface of the substrate 294 and is covered by a second metal film 302 that is deposited over the first graphics layer 300. A second graphics layer 304 is located between the second metal film 302 and a bottom substrate 306. An adhesive layer 308 bonds the top and bottom substrates 298 and 306 together.

The first metal film 292 provides the usual function of blocking the immediately underlying first graphics layer 300 from sight until acted on by a clearing agent. The second metal film 302, which is preferably deposited over the first graphics layer 300, blocks sight of the first graphics layer 300 from an opposite direction. If necessary, a median layer, such as an adhesive, can be applied over the first graphics layer 300 to support the deposition of the second metal film 302. Alternatively, the first graphics layer 300 could also be positioned between the first metal film 292 and the substrate 294, which could be opaque obviating the need for the second metal film 302 and the second graphics layer 304.

The metal films 292 and 302 are preferably smooth, reflective, and have thicknesses measured in hundreds of Angstroms. Tampering with these metal films 292 and 294 is likely to result in permanently damaging them, which would be readily apparent. In addition, the metal films 292 and 302 cannot be easily repaired or reproduced. The application of most chemical solvents will also produce visible damage to these films 292 and 302.

As a ready check against tampering, the second graphics layer 304 is rendered at least partially visible upon the clearing of the first metal film 292 if any portion of the second metal film 302 is damaged. Alternatively, the second metal film 302 could be intentionally cleared by exposure to a chemical clearing agent to produce a compound display, where the two graphics layers 300 and 304 are revealed simultaneously or in sequence.

Figure 24:
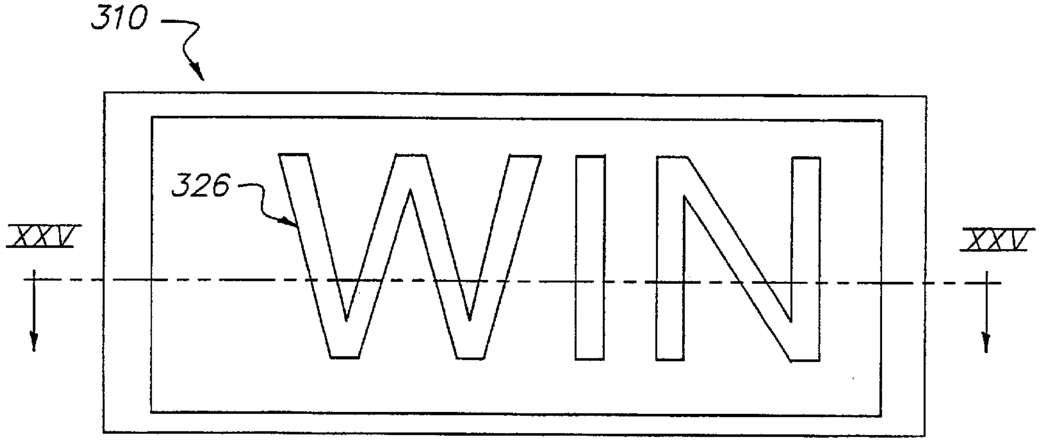
FIG. 24 is a plan view of an irreversible display in which a protective layer is applied in a pattern over a metal film. A message formed by the pattern is visible.
Figure 25:
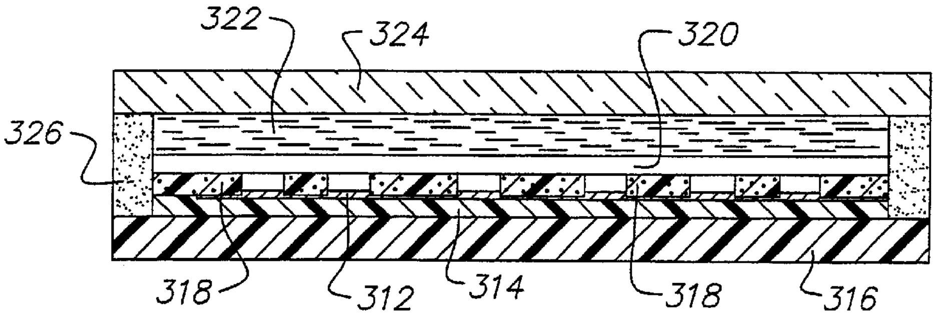
FIG. 25 is a cross-sectional view taken along line XXV—XXV of FIG. 24.

An irreversible display 310 that does not rely on an underlying graphics layer to reveal new information is illustrated by FIGS. 24 and 25. A metal film 312, which can be deposited onto an underlying substrate 314 as illustrated or which can be a self-supporting foil, is mounted on a bottom substrate 316. Either substrate 314 or 316 can be opaque. An adhesive layer (not shown) can be supplied to secure the metal film 312 to the bottom substrate 316.

A clear protective layer 318, such as a varnish or adhesive, is applied in a pattern over the metal film 312. A temporary barrier layer 320 separates the protective layer 318 and the remaining portion of the metal film 312 from a chemical clearing agent 322. A top substrate 324 together with an adhesive layer 326 confines the clearing agent 322 within the display 310.

The metal film 312 is preferably clearly visible through the top substrate 324, the clearing agent 322, and the barrier layer 320. However, the protective layer 318 preferably does not exhibit sufficient contrast to be distinguished from the metal film 312. Upon rupturing the barrier layer 320, the clearing agent 322 moves into contact with the exposed areas of the metal film 312. The protective layer 318 prevents the clearing agent 322 from contacting remaining portions of the metal film 312. Clearing takes place in a pattern complementary to the pattern of the protective layer 318, revealing an indicium 326 ("win") formed by a contrast between the cleared and not cleared portions of the metal film 312. An underlying graphics layer (not shown) can be provided to enhance the contrast.

Figure 26:
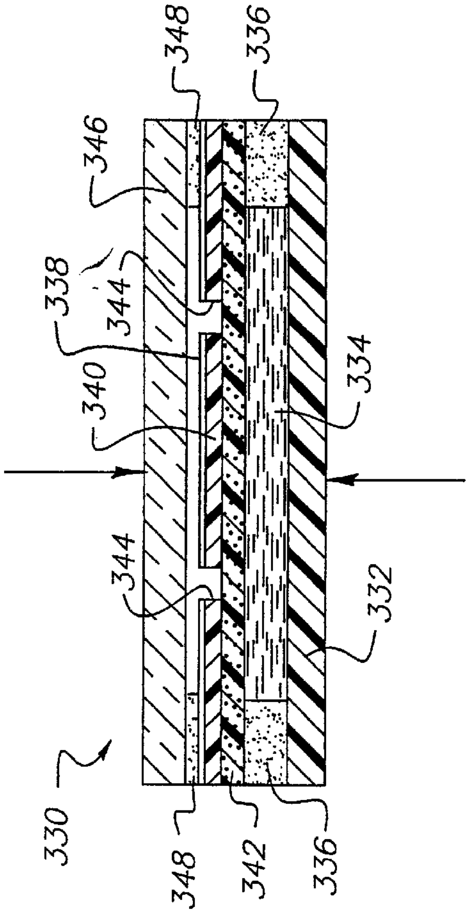
FIG. 26 is a cross-sectional view of an irreversible display with clearing agent confined within a reservoir beneath a metal film.

An irreversible display 330 of FIG. 26 demonstrates yet other possibilities for arranging layers and displaying indicia. A bottom substrate 332 supports a reservoir of clearing agent 334 within a boundary set by an adhesive 336. A metal film 338 is supported on a perforated substrate 340 over the clearing agent 334 and is further separated from the clearing agent 334 by a barrier layer 342, such as a varnish.

In contrast to other embodiments, the film substrate 340 is made opaque or is otherwise modified to provide some form of indicia, if nothing more than a patch of color, beneath the metal film 338. Although a separate graphics layer is generally preferred for forming indicia, the corresponding substrates underlying the metal film of the earlier embodiments could also be used to form or support a desired indicia.

Openings 344 through the metal film 338 and the underlying substrate 340 together with the barrier layer 342 provide gated pathways between the clearing agent 334 and the metal film 338. A transparent top substrate 346 is bonded over the metal film 338 with an adhesive 348 leaving space for the clearing agent 334 to flow over the exposed surface of the metal film 338.

Activation is accomplished by squeezing the top and bottom substrates 346 and 332 together, thereby rupturing the barrier layer 342 and forcing the clearing agent 334 through the openings 344 and across a surface of the metal film 338. Localized reactions, as described earlier, clear the metal film 338 and reveal the indicium embodied in the immediately underlying substrate 340.

The irreversible displays described above can be used for a variety of purposes including stand-alone devices and display components of other products or devices. For example, the displays can be used as game pieces, message cards, security devices, or elapsed time indicators. Layers of adhesive and release can also be added to the substrates to incorporate the displays into pressure-sensitive labels or other printable products. The displays can also be formed as integral parts of the packaging of other products.

The displays can be switched from a first state in which the thin metal film is opaque to a second state in which a predetermined area of the thin metal film becomes substantially transparent, but the displays cannot be restored to the first state. The clearing that takes place in the thin metal films to reveal indicia is irreversible. Preferably, the revealed indicia remain permanently displayed. Although the indicia preferably underlie the metal film, the indicia can also be formed as patterns in the metal film itself. The revealed indicia can also be used to transform, replace, contrast, or complete another overlying or underlying image.

The underlying indicia, which can range from a patch of color to patterns, symbols, or other more imaginative forms, is preferably formed prior to being overlaid by the metal film. However, the indicia could also be formed later in an underlying medium (i.e., after the medium is covered by the metal film) by a developing mechanism, such as a thermal color-developing mechanism. Unique, timely, or interactive information could be printed on demand just prior to distribution or use.

The composition, amount, and physical properties (e.g., viscosity, yield value, and adhesion) of the chemical clearing agent can be adjusted to match the needs of particular applications. A compound change in display can be achieved by adding other chemical transformation components to the clearing agent. For example, a pH-indicating solution that undergoes a color change in the presence of the oxidizing reaction on the metal film can be added to the clearing agent. The pH of the clearing agent can change as the metal film is cleared, resulting in a color change that can tint any underlying graphics.

The thin metal films are preferably formed by deposition onto substrates, which are preferably transparent or at least translucent, unless also intended to embody or otherwise participate in forming an underlying opaque indicium. Deposition methods include vacuum evaporation, cathode sputtering, electroplating, and various chemical reactions in a controlled atmosphere or electrolyte. In addition, the metal films are preferably smooth, shiny, and thick enough to obscure the view of underlying layers. Thicknesses between 100 and 1000 Angstroms are preferred. Thicker metal films, including at least partially self-supporting metal foils, can also be used, particularly for applications requiring slower clearing rates.

The individual substrates that provide support for the displays can be formed as single layers or as laminations for such purposes as providing color patterns, further rigidity, or better sealing capabilities. However, all of the substrates, including the substrate that normally supports the thin metal film, are preferably supplied in rolls that can be unwound into an in-line press. Stress relief can be applied if the substrates are too inflexible for winding. All of the other layers, including the graphics layers, clearing agents, and the adhesives are preferably applied in patterns or injected into predetermined positions on one of the substrates by stations arranged along the press. Flexographic printing is preferred where possible, especially for laying down inks, but other printing techniques including extrusion or injection can be used where needed to lay down layers of clearing agent and adhesive.

The thin metal films are preferably predeposited onto substrates in advance of any press operations. However, thin metal film could also be transfer printed from a temporary carrier to the substrate along the press, such as by hot or cold stamping. For example, a thin metal film could be transferred from the temporary carrier by cold stamping in a pattern that matches an adhesive pattern on a substrate. Self-supporting metal foils could also be used if thin enough to clear within a required time span. Our preferred metal films are made of aluminum, zinc, or silver; but many other metals, including metal alloys, can be used.

Figure 27:
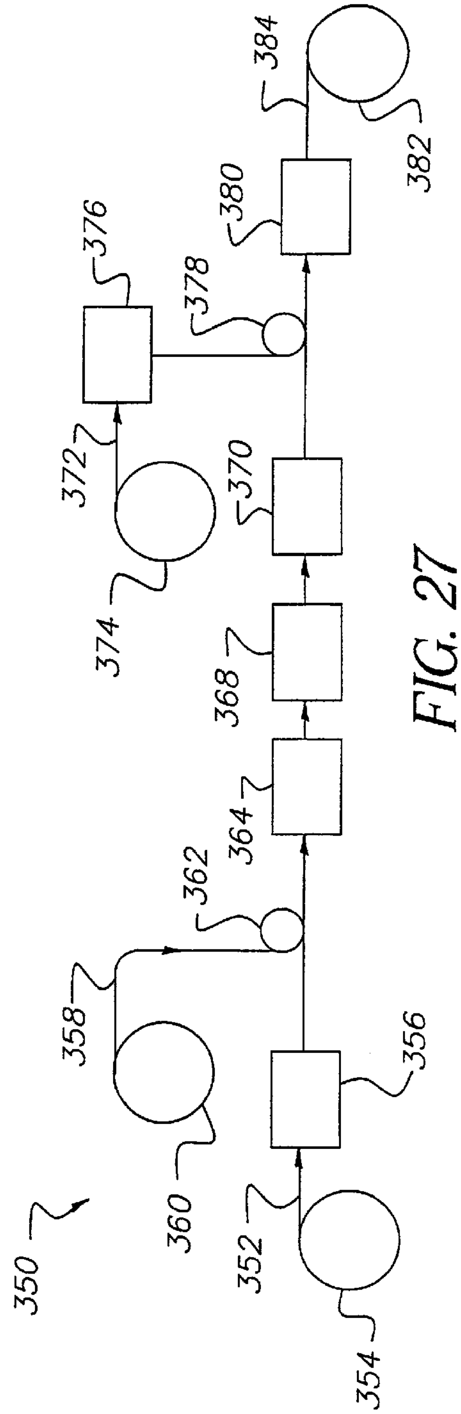
FIG. 27 is a diagram of an in-line press for manufacturing the irreversible displays.

An exemplary in-line press 350 for making our irreversible displays, particularly the display of FIGS. 1–3, is depicted in FIG. 27. A bottom substrate (web) 352 is unwound from a roll 354 and advanced to a print station 356 that applies a graphics layer. A metal film 358 on a transparent supporting substrate (web) is unwound from a roll 360. A laminator 362 joins the metal film to the bottom substrate 352, and a die-cut station 364 cuts the metal film into a succession of patterns. An adhesive or other bonding agent can be used to secure the metal film 358 to the bottom substrate 352. The metal film 358 could also be mounted in a variety of other ways such as by transfer printing or by substituting a metal foil.

An adhesive station 368 applies adhesive in patterns surrounding both the successions of die-cut metal film and reservoirs (not shown) for confining a clearing agent. Thinner or otherwise weaker portions of the adhesive patterns form gated pathways (not shown) between the reservoirs and the die-cut metal film. A dispensing station 370 injects the clearing agent into the reservoirs. A transparent top substrate (web) 372 is unwound from a roll 374 and is directed through a vacuum forming station 376 for forming a succession of bulges through the top substrate 372 for increasing reservoir volumes. A laminator 378 joins the top and bottom substrates 372 and 352, sealing the clearing agent within the reservoirs. Heat sealing (not shown) can be used in combination with or as a substitute for the adhesive to join the two substrates together. An embossing station 380 forms collars around the reservoirs in advance of a rewind station 382 to reduce pressure on the reservoirs when a resulting succession of displays 384 are roll wound. The collars could also be formed by a separate substrate or embossments in the top substrate alone. In place of reservoirs, successions of openings can be formed in the top substrate 372 to provide access to the metal film. Similar adaptations can be made for producing the other embodiments on press.

Such in-line processing can be used to produce successions of irreversible display cells in large volumes at low cost. Additional stations, such as die cutters, can be used to separate succeeding displays and to adapt the displays for their intended use as stand-alone displays or as displays incorporated within other products or product packages. A similar arrangement of in-line stations can be used to produce other embodiments of our displays including the addition or substitution of stations for applying layers such as barrier layers, protective layers, graphics layers, or layers of release. Additional rolls of substrates including liners and spacers can also be appended to the press.

We claim:

1. A method of making a succession of irreversible displays comprising the steps of:

printing a graphics layer on an advancing web;

covering successive portions of the graphics layer with a metal film; and applying a chemical clearing agent in a succession of patterns out of contact with portions of the metal film that overlie the graphics layer, the clearing agent being relatively movable into contact with the surface of the metal film for inducing a chemical reaction that clears the metal film and reveals the graphics layer.

2. The method of claim 1 including further steps of die cutting the metal film into individual patterns and applying the patterns to the advancing web.

3. The method of claim 1 including a further step of forming a succession of reservoirs for confining the clearing agent.

4. The method of claim 3 including a further step of laminating another web together with the advancing web.

5. The method of claim 4 in which the step of laminating aligns windows in the another web with the metal film on the advancing web.

6. The method of claim 5 in which the step of forming the succession of reservoirs includes forming the succession of reservoirs between the two webs.

7. The method of claim 5 including the further step of forming collars adjacent to the reservoirs to reduce pressures on the reservoirs.

8. The method of claim 1 in which the step of applying the clearing agent includes applying the clearing agent to the advancing web.

9. The method of claim 8 including a further step of laminating another advancing web over the clearing agent.

10. The method of claim 1 in which the step of applying the clearing agent includes applying the clearing agent to another advancing web.

11. The method of claim 10 in which the two webs are laminated together with the clearing agent out of contact with the metal film.

12. The method of claim 1 comprising a further step of laminating the clearing agent and the metal film between the advancing web and another advancing web.

13. The method of claim 12 including a further step of separating the clearing agent from the metal film with a spacer.

14. The method of claim 12 including a further step of separating the clearing agent from the metal film with a breakable barrier layer.

15. The method of claim 12 including a further step encapsulating the clearing agent.

16. The method of claim 1 including a further step of forming the clearing agent as an adhesive.

17. The method of claim 16 including the further step of covering the clearing agent with a release layer.

18. A method of making a succession of irreversible displays comprising the steps of:

printing a graphics layer on an advancing web;

covering successive portions of the graphics layer with a metal film;

laminating another web to the advancing web; and forming a succession of openings in one of the webs in communication with the metal film for directing a chemical clearing agent through the opening into contact with the metal film, the clearing agent inducing a chemical reaction that clears the metal film and reveals the graphic layer.

19. The method of claim 18 in which the succession of openings are display windows aligned with the successive portions of the graphics layer.

20. The method of claim 18 including a further step of laminating a transport layer between the two webs for transporting clearing agent from the openings to the metal film.

21. A method of forming a succession of irreversible displays comprising the steps of:

providing a print medium on an advancing web;

covering successive portions of the print medium with a metal film;

forming a succession of pathways for conducting a chemical clearing agent to the metal film; and separating successive portions of the advancing web into a succession of irreversible displays that can be activated by conducting clearing agent along the succession of pathways into contact with the metal film to induce a chemical reaction that clears the metal film and reveals portions of the print medium.

22. The method of claim 21 including a further step of printing a succession of indicia on the print medium.

23. The method of claim 21 including a further step of laminating another advancing web over the metal film.

24. The method of claim 23 including a further step of forming a succession of reservoirs between the advancing webs for confining the clearing agent.

25. The method of claim 24 in which the step of forming the succession of pathways includes connecting the succession of reservoirs to the succession of pathways for conducting the clearing agent from the reservoirs to the metal film.

26. The method of claim 25 in which the step of forming the succession of pathways includes forming gates within the pathways to temporarily confine the clearing agent within the reservoirs.

27. The method of claim 21 including the further step of die cutting the metal film into a succession of patterns in registration with the successive portions of the print medium.

28. The method of claim 21 in which the print medium is a thermal color-developing mechanism.

* * * * *